(12) United States Patent
Paveletzke et al.

(10) Patent No.: US 11,299,305 B2
(45) Date of Patent: Apr. 12, 2022

(54) SEWN STACK OF ABSORBENT SHEETS

(71) Applicant: Kimberly-Clark Worldwide, Inc., Neenah, WI (US)

(72) Inventors: Julie Ann Paveletzke, Appleton, WI (US); Christopher Peter Olson, Neenah, WI (US)

(73) Assignee: KIMBERLY-CLARK WORLDWIDE, INC., Neenah, WI (US)

(*) Notice: Subject to any disclaimer, the term of this patent is extended or adjusted under 35 U.S.C. 154(b) by 60 days.

(21) Appl. No.: 16/678,584

(22) Filed: Nov. 8, 2019

(65) Prior Publication Data
US 2020/0069120 A1    Mar. 5, 2020

Related U.S. Application Data

(63) Continuation of application No. PCT/US2017/034255, filed on May 24, 2017.

(51) Int. Cl.
*B65B 27/08* (2006.01)
*A47K 10/20* (2006.01)
(Continued)

(52) U.S. Cl.
CPC .............. *B65B 27/08* (2013.01); *A47K 10/20* (2013.01); *B01J 20/24* (2013.01);
(Continued)

(58) Field of Classification Search
CPC .......... B65B 27/08; B42D 5/00; B42D 1/004; B42D 1/00; B42B 2/02; B01J 20/28035;
(Continued)

(56) References Cited

U.S. PATENT DOCUMENTS

| 1,170,498 A | 2/1916 | Klein |
| 2,029,245 A | 1/1936 | Lyon |

(Continued)

FOREIGN PATENT DOCUMENTS

| CN | 2167839 Y | 6/1994 |
| CN | 201018959 Y | 2/2008 |

(Continued)

OTHER PUBLICATIONS

ASTM D5650-97(2007) (Withdrawn Version)—Standard Test Method for Resistance to Bending of Paper of Low Bending Stiffness, ASTM. Retrieved from URL https://compass.astm.org/Standards/WITHDRAWN/D5650.htm on Mar. 12, 2019 (Year: 2007).

(Continued)

*Primary Examiner* — Justin V Lewis
(74) *Attorney, Agent, or Firm* — Kimberly-Clark Worldwide, Inc.

(57) ABSTRACT

The invention provides a stack comprising a plurality of absorbent sheets stacked in facing arrangement. The stack is bound along its top edge by at least one line of stitches comprising a plurality of spaced apart stitch holes and a thread disposed therein. Individual sheets further comprise a line of perforations comprising a plurality of spaced apart perforation holes. The line of stitches and the line of perforations are such that there is generally a one-to-one numerical correspondence amongst at least a majority of the plurality of stitch holes and perforation holes.

17 Claims, 3 Drawing Sheets

(51) Int. Cl.
  *B42B 2/02* (2006.01)
  *B42D 1/00* (2006.01)
  *B42D 5/00* (2006.01)
  *B65D 63/10* (2006.01)
  *B01J 20/28* (2006.01)
  *B01J 20/24* (2006.01)
  *A47K 10/16* (2006.01)

(52) U.S. Cl.
  CPC ........... *B01J 20/28035* (2013.01); *B42B 2/02* (2013.01); *B42D 1/004* (2013.01); *B42D 5/00* (2013.01); *A47K 10/16* (2013.01)

(58) Field of Classification Search
  CPC ........... B01J 20/24; B01J 20/28; A47K 10/20; A47K 10/16
  USPC ......... 428/26, 32.16, 32.37, 36.1, 36.2, 190, 428/192, 193, 365; 281/3.1, 5, 15.1, 281/21.1, 27, 33
  See application file for complete search history.

(56) References Cited

U.S. PATENT DOCUMENTS

| | | | |
|---|---|---|---|
| 2,077,664 A | 4/1937 | Beardsley | |
| 2,341,119 A | 2/1944 | Rost | |
| 2,843,868 A | 7/1958 | Borgstrom | |
| 3,716,132 A | 2/1973 | Lewyckyj | |
| 3,778,324 A | 12/1973 | Lavigne | |
| 4,007,950 A | 2/1977 | Giulie | |
| 4,342,564 A | 8/1982 | Lehmacher | |
| 4,662,005 A | 5/1987 | Grier-Idris | |
| 4,715,758 A | 12/1987 | Stobb | |
| 5,299,833 A | 4/1994 | Madole | |
| 5,524,998 A | 6/1996 | Schwartz | |
| 5,601,312 A | 2/1997 | Funkhouser | |
| 5,656,132 A | 8/1997 | Farrington et al. | |
| 6,263,814 B1 | 7/2001 | Lawrence | |
| 6,536,185 B2 | 3/2003 | Weder et al. | |
| 6,548,135 B1 * | 4/2003 | Hershey | B01J 20/28023 2/49.1 |
| 6,810,554 B2 | 11/2004 | McKay | |
| 7,059,505 B2 | 6/2006 | Tabor | |
| 7,449,085 B2 | 11/2008 | Hermans et al. | |
| 7,661,715 B2 | 2/2010 | Porat | |
| 7,789,430 B2 | 9/2010 | Wittmeyer, Jr. et al. | |
| 7,811,649 B2 | 10/2010 | Post | |
| 8,834,984 B2 | 9/2014 | Wildeman | |
| 9,234,313 B2 | 1/2016 | Hermans et al. | |
| 10,611,541 B2 | 4/2020 | Dieringer et al. | |
| 2003/0124935 A1 | 7/2003 | Smith et al. | |
| 2004/0055521 A1 | 3/2004 | Katou | |
| 2006/0068145 A1 | 3/2006 | Chandaria | |
| 2007/0051484 A1 | 3/2007 | Hermans et al. | |
| 2009/0148646 A1 | 6/2009 | Bachmann et al. | |
| 2012/0217734 A1 | 8/2012 | Edwards | |
| 2013/0077338 A1 | 3/2013 | Wenzel et al. | |
| 2013/0127148 A1 * | 5/2013 | Cenzano | B42D 9/008 281/15.1 |
| 2014/0058981 A1 | 2/2014 | Mastromarco | |
| 2016/0090697 A1 | 3/2016 | Hermans et al. | |
| 2016/0157647 A1 | 6/2016 | Rampersad | |
| 2016/0355987 A1 | 12/2016 | Hermans et al. | |
| 2018/0362236 A1 | 12/2018 | Dieringer et al. | |
| 2019/0092504 A1 | 3/2019 | Paveletzke et al. | |
| 2020/0069120 A1 | 3/2020 | Paveletzke et al. | |
| 2020/0275809 A1 | 9/2020 | Paveletzke et al. | |
| 2020/0290304 A1 | 9/2020 | Paveletzke et al. | |

FOREIGN PATENT DOCUMENTS

| | | |
|---|---|---|
| CN | 101387049 A | 3/2009 |
| CN | 102131675 A | 7/2011 |
| CN | 103911844 A | 7/2014 |
| EP | 2210845 B1 | 12/2011 |
| GB | 190920248 A | 1/1910 |
| GB | 2578017 A | 4/2020 |
| GB | 2578018 A | 4/2020 |
| GB | 2581725 A | 8/2020 |
| JP | 2002127640 A | 5/2002 |
| JP | 2006056542 A | 3/2006 |
| WO | 2014118688 A2 | 8/2014 |
| WO | 2018217195 A1 | 11/2018 |
| WO | 2018217197 A1 | 11/2018 |
| WO | 2019088995 A1 | 5/2019 |

OTHER PUBLICATIONS

TAPPI T494 (2006) Tensile Properties of Paper and Paperboard, TAPPI, Retrieved from URL http://www.tappi.org/content/sarg/t494.pdf on Mar. 12, 2019 (Year: 2006).

* cited by examiner

SEWN STACK OF ABSORBENT SHEETS

RELATED APPLICATIONS

The present application claims priority to PCT Patent Application No. PCT/US17/34255, filed on May 24, 2017, which is incorporated herein by reference.

BACKGROUND OF THE INVENTION

Consumers want easy, convenient, and quick access to absorbent sheet products, such as paper towels, toilet tissue, napkins, facial tissue and the like for use in their home or work areas. Particularly, consumers want the products available where spills or messes occur, which are often in areas of the home where such products are traditionally kept, such as the kitchen or bathroom. When spills or messes occur in these areas consumers want quick and convenient access to absorbent sheets to clean up messes quickly to avoid damage to surfaces throughout the home. Therefore, there is a need for absorbent sheets, and particularly stacks of absorbent sheets, that may be easily located throughout the home and provide a convenient dispensing format to ensure easy, convenient and quick access to sheets where and when consumers need them.

Not only do consumers desire sheet formats that are easy and convenient to use, they also want formats that are aesthetically pleasing and compliment their home decor. Often to provide the ease and convenience consumer's desire, the sheet products are designed to be left in plain view in the home rather than stored away in cabinets. As such the products must be aesthetic pleasing and function as a home accessory.

Therefore, there is a need in the art for an absorbent sheet product that provides consumers with a convenient and easily accessible dispensing when and where the consumer needs such products. Furthermore, there is a need for a dispensing format that functions as a home accessory and compliments the consumer's home decor.

SUMMARY OF THE INVENTION

The present invention addresses the consumer's need for a convenient and easily accessible dispenser for absorbent sheets. Absorbent sheets are provided in a stack that is sewn along one edge to bind the stack and individual sheets are perforated to provide easy and convenient removal of single sheets. The stack is compact, sleek and the sewn binding compliments many consumer's home decor. Moreover, the stack may be mounted in a number of different places, providing the consumer with easy access to absorbent sheets throughout the home. For example, the stack may be laid flat on a horizontal surface, such as a countertop or table, or may be mounted to a vertical surface, such as a wall or cupboard using conventional and readily available mounting hardware such as adhesives or mechanical fasteners.

Accordingly, in one embodiment the present invention provides a stack of absorbent sheet material comprising a plurality of absorbent sheets having a machine direction and a cross-machine direction stacked in facing arrangement to form a stack of absorbent sheets, the stack having a top edge and a bottom edge; a binding element for binding the sheets together to form a stack disposed adjacent to the top edge of the stack, the binding element comprising a plurality of spaced apart stitching holes and a thread disposed between a first and a second stitching hole; and a line of perforations comprising a plurality of spaced apart perforation holes, wherein at least a portion of the plurality of stitches and a portion of the plurality of perforation holes are arranged pairwise.

In certain embodiments at least about 50 percent, and more preferably at least about 60 percent and still more preferably at least about 70 percent, such as from about 50 to about 100 percent and more preferably from about 70 to about 100 percent of stitching holes have a corresponding perforation hole. In this manner there is a one-to-one numerical correspondence between at least a portion of the plurality of perforation holes and at least a portion of the plurality of stitching holes.

In another embodiment the present invention provides a stack of absorbent sheet material comprising a plurality of absorbent sheets having a machine direction and a cross-machine direction stacked in facing arrangement to form a stack of absorbent sheets, the stack having a top edge and a bottom edge; a plurality of spaced apart stitching holes disposed adjacent to the top edge of the stack, a binding comprising a thread disposed between a first and a second stitching hole for binding the stack of sheets together; and a line of perforations comprising a plurality of spaced apart perforation holes, wherein there is one-to-one numerical correspondence between at least a portion of the plurality of perforation holes and at least a portion of the plurality of stitching holes.

The stitching of the stack of absorbent sheets can be carried out using one thread, two threads or three or more threads. Further, the stitching may be carried out by any means usually employed for the stitching of cloths such as single chain stitch, lock stitch or the like.

In one embodiment the first stitching thread part and the second stitching thread part belonging to at least one line is formed by a single chain stitch of a thread.

In another embodiment the plurality of the first stitching thread parts and the second stitching thread parts belonging to at least one line comprises two continuous threads crossing each other to be bound with each other so as to withstand the tensile force, and the first and the second stitching thread parts are formed by the lock stitch of two threads.

In still other embodiments the plurality of the first stitching thread parts and the second stitching thread parts belonging to at least one line comprise two continuous threads crossing each other to be bound with each other so as to withstand the tensile force, and the first and the second stitching thread parts are formed by the lock stitch of two threads. For example, at least one of the first stitching thread parts may be adapted to form an independent closed loop from other stitching thread parts, and at least one of the second stitching thread parts may also be adapted to form an independent closed loop from other stitching thread parts. The closed loop may be formed by the binding of adjacent thread parts.

In yet other embodiments the present invention provides a stack of absorbent sheets comprising a plurality of absorbent sheets stacked in facing arrangement with one another to form a stack having a top edge and bottom edge; a single line of stitches extending parallel to the top edge of the stack, the single line of stitches comprising a multiplicity of individual stitch holes and at least one thread disposed between a first and second thread hole of the multiplicity of individual stitch holes thereby forming a stitch; and a single line of perforations extending parallel to the top edge of the stack and spaced part from the single line of stitches, the single line of perforations comprising a multiplicity of individual perforation holes, wherein there is a one-to-one numerical correspondence between the multiplicity of individual perforation holes and the multiplicity of individual stitching holes.

In still other embodiments the present invention provides a method of manufacturing a stack of sewn and perforated absorbent sheets comprising the steps of providing a plurality of absorbent sheets; stacking the plurality of absorbent sheets in facing arrangement with one another; providing a sewing and perforating apparatus comprising a first tine and a second tine; wherein the first tine is adapted to receive a thread and the first and second tines are adapted to be displaced in the vertical direction by a drive means; threading the first tine with a thread; moving the first and second tines towards and through the stack of sheets, wherein the first tine creates a stitch hole and the thread is threaded through the stitch hole and the second tine creates a perforation hole; and moving the sewing and perforating apparatus or the stack of sheets in the horizontal direction and repeating previous step.

DETAILED DESCRIPTION OF PARTICULAR EMBODIMENTS

Figure 1:
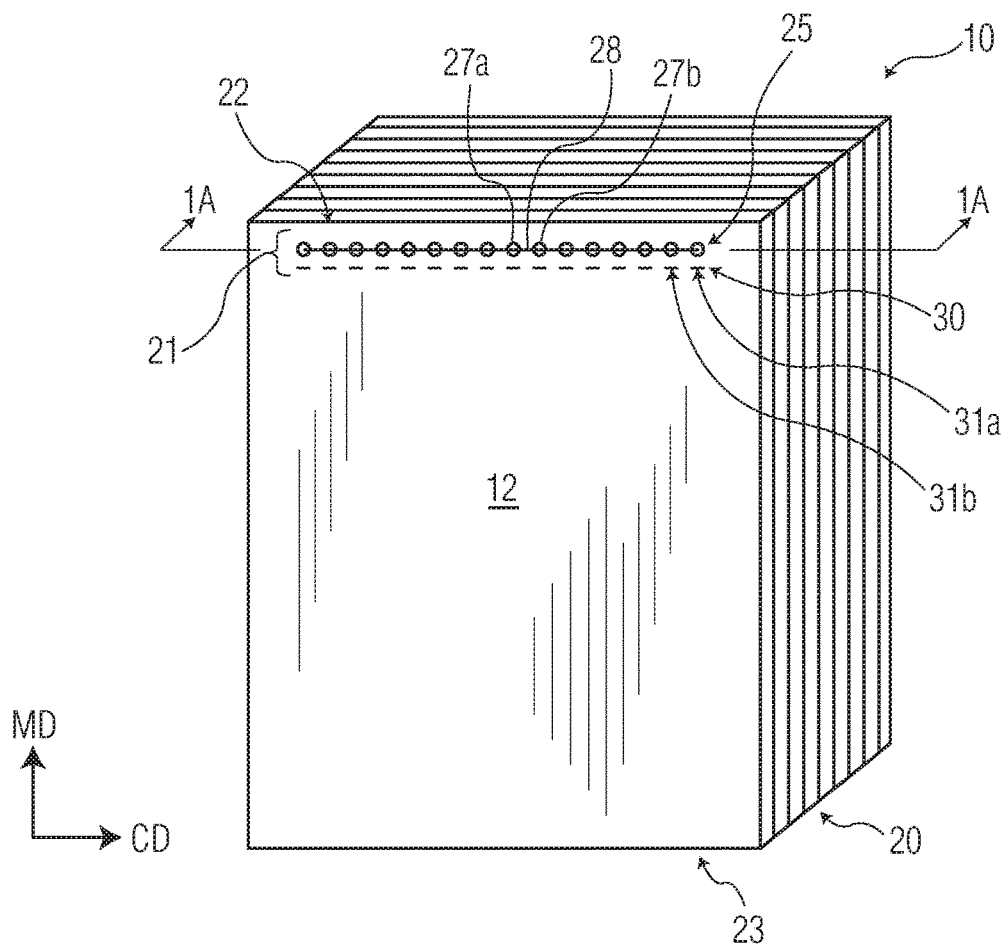
FIG. 1 is a perspective view of a stack of absorbent sheets according to one embodiment of the present invention.

The invention relates to a stack of absorbent sheets, such as paper towels, toilet tissue, napkins, facial tissue and the like, wherein the stack is bound with thread and individual sheets are perforated to facilitate separation from the stack. The type of material used for the absorbent sheet should be understood to comprise any type of predominantly cellulosic material. However, the term "absorbent sheet" is not limited to paper products such as bath tissue and towels but can also comprise absorbent nonwoven materials. These nonwoven materials can include synthetic fibers or blends of synthetic and cellulosic fibers with similar properties to those of wet laid tissue products formed from cellulosic fibers. In certain embodiments the absorbent sheets may comprise nonwoven airlaid sheets comprising synthetic fibers, binders, wet strength agents and the like. The sheets of material are stacked in facing arrangement and bound together by sewing and include perforations so as to facilitate removal of individual sheets from the stack. These and other embodiments will now be discussed in more detail with reference to the figures.

Generally, in one embodiment of the present invention, individual sheets within a stack are bound together by sewing the sheets together using thread. In this manner the stack has a sewn region that defines a binding element. The binding element binds the sheets together and maintains the integrity of the stack. In certain embodiments, the binding element consists essentially of stitches and is sufficiently strong to bind and retain the sheets such that the binding element is substantially free from any adhesive. As such, in a preferred embodiment, individual sheets within the stack are stacked in facing arrangement without an adhesive disposed there between. In still other embodiments, the binding element comprises one or more line of stitches, which are sufficiently strong so as not to require any other form of mechanical attachment, such as clips, staples, grommets or the like.

While an adhesive or other mechanical means of attachment is not necessary, the invention is not so limited. In other embodiments, in addition to at least one line of stitches, the binding element may comprise a hot melt or pressure sensitive adhesive. In still other embodiments adjacent sheets may be bound to one another by thermal bonding, ultrasonic bonding, or chemical bonding. It is to be understood that the foregoing bindings are in addition to the at least one line of stitches that binds and retains individual sheets to form the stack. The supplemental bindings may be used to bind all of the sheets within a stack, only a portion of the sheets, or in some instances to bind a backing board or strip to the stack, as discussed in more detail below.

While supplemental bindings may be employed, in a preferred embodiment the binding element consists essentially of one or more lines of stitches. Thus, in a preferred embodiment, rather than employ an adhesive or the like to bind individual sheets together, the present invention uses at least one line of stitches, where the single line of stitches may employ one thread, two threads or three or more threads. Various stitches useful in binding the stack of absorbent sheets will be discussed in more detail below. The stitches may be construed using well known sewing techniques which typically employ a needle and thread to form a line of needle holes through which thread or yarn is threaded to bind the stack of sheet material.

Binding the stack by sewing typically results in the stack having at least one line of stitches comprising a continuous series of holes with thread disposed there between. For example, with reference to FIG. 1, the stack of absorbent sheet material 10 comprises a plurality of individual sheets 20 stacked in facing arrangement with one another and bound by a line of stitches 25. The line of stitching 25 which comprises a continuous line of spaced apart stitch holes 27a, 27b with thread 28 disposed there between. Individual sheets further comprise a line of perforations 30 comprising spaced apart individual perforation holes 31a, 31b. The line of stitching binds and retains the sheets while the line of perforations allows a user to separate individual sheets from the stack. Generally, the line of stitching 25 is referred to as the binding and the area of the stack bound by the line of stitching is referred to herein as the bound or binding area 21, which as illustrated in FIG. 1 and is proximate to one edge 22 of the sheets.

The sewing or stitching thread used to bind stacks of absorbent sheet material may comprise monofilament thread, or multi-filament thread. The thread weight may be a function of the material properties of the sheets being bound, such as caliper, fiber compositions, tensile strength or the like. The thread weight may range from about 20 to about 120 weight. The thread may comprise a denier of from about 1 to about 2000 denier, such as from about 10 to about 1500 denier, and more preferably from about 100 to about 1000 denier and still more preferably from about 150 to about 500 denier.

The thread may comprise plied or twisted threads (e.g., z twist or s twist). The thread material may comprise a natural fiber, such as cotton, wool, silk, or other natural material, or may comprise a synthetic fiber such as polyester, nylon, polypropylene, rayon, or other synthetic material. The thread may comprise a continuous filament. The thread may comprise a monofilament. The thread may comprise a staple filament. The thread material may comprise a metal. The thread may comprise a wire, for example, a polymeric wire, or composite wire. The thread material preferably is biocompatible and, in some respects is resorbable. The thread material may comprise a polydioxanone, polycarbonate, polyurethane, poly(alpha-ester), polyglycolide, polylactide (e.g., poly(L-lactic acid), poly(D-lactic acid), and poly(D, L-lactic acid), poly (4-hydroxybutyric acid)—which is a homopolymer of 4-hydroxybutyrate (4HB), and belongs to a diverse class of materials called polyhydroxyalkanoates (PHAs)—and poly(lactide-co-glycolide)), polycaprolactone, polypropylene, polyester, poly(propylene fumarate), polyanhydride, polyacetal, polycarbonate (e.g., poly(trimethylene carbonate)), poly(ortho ester), polyphosphazene, polyphosphoester, polytetrafluoroethylene, polyethylene terephthalate, or any combination or co-polymer thereof. Polypropylene, polyester, and polyethylene are preferred, with monofilament polyethylene more preferred.

In those embodiments where more than one thread is used to bind the stack, the threads may be the same or they may be different. For example, if the stack is bound by a chain stitch employing two threads the needle thread may comprise a first thread material having a first denier and stretch and the looper may comprise a second thread material having a second denier and stretch, wherein the denier and stretch of the first and second thread materials is different. Similarly, if lock stitching is used the bobbin thread may contain the same thread as the needle thread or, in other instances, a dissimilar thread.

The number of stitches per unit length, that is, the number of the surface thread parts of the first and/or the second stitching thread parts per unit length in each of the lines can optionally be selected depending on the kind and the material of the absorbent sheets to be stacked and dispensed, the density and the thickness of the sheets or the resulting stack, the material and the diameter of the stitching thread, as well as the diameter of the stitching needle. Similarly, the number of stitches per unit surface area, that is, the number of the surface thread parts of the first and/or the second stitching thread parts per unit surface area of the bound sheet, may be varied. For example, the number of stitches per unit length may range from about 10 to about 30 stitches per 10 cm, such as from about 15 to about 20 stitches per 10 cm. In certain embodiments the stitches may have a length from about 2.0 to about 8.0 mm, and more preferably from about 4.0 to about 6.0 mm. In other instances, the bound area of the stack may range from about 20 to about 60 cm$^2$, such as from about 30 to about 40 cm$^2$ and the area may comprise from about 10 to about 40 stitches, such as from about 15 to about 25 stitches.

Figure 1A:
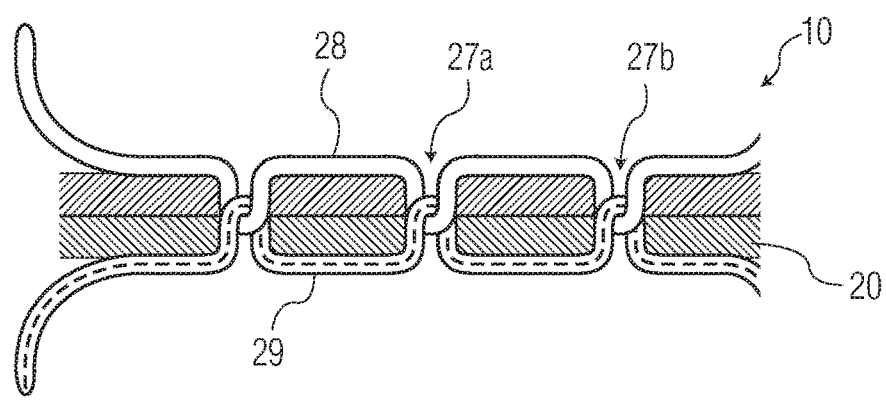
FIG. 1A is a cross-section through line 1A-1A illustrating a line of stitches according to one embodiment of the present invention.

The stitching of the stack of absorbent sheets can be carried out using one thread, two threads or three or more threads. Further, the stitching may be carried out by any means usually employed for the stitching of cloths such as single lock stitch, chain stitched, loop stitch or the like. In a preferred embodiment of the method according to this invention, the stitching is carried out by a single line lock stitch. An exemplary lock stitch is illustrated in FIG. 1A and generally comprises two separate threads an upper thread 28 and lower thread 29 that are intertwined by the coordination of the sewing needle, which delivers the upper thread 28 into the stack of sheets 20 being sewn, and a secondary mechanism, typically a bobbin and bobbin driver, which provides the lower thread 29. The sewing needle forms the stitch hole 27 and threads the upper thread 28 therethrough. The coordinated movement of t e sewing needle and bobbin driver intertwines the upper and lower threads to form the lock stitch.

In other embodiments the stack of absorbent sheets may be bound by a chain stitch or a loop stitch. Where the stack is bound using a loop stitch the method may also comprise a further step of securing adjacent stitching thread parts produced at the stitching step by means of binding or by adhesives so that at least one stitch formed by stitching may form an independent closed loop.

Figure 2:
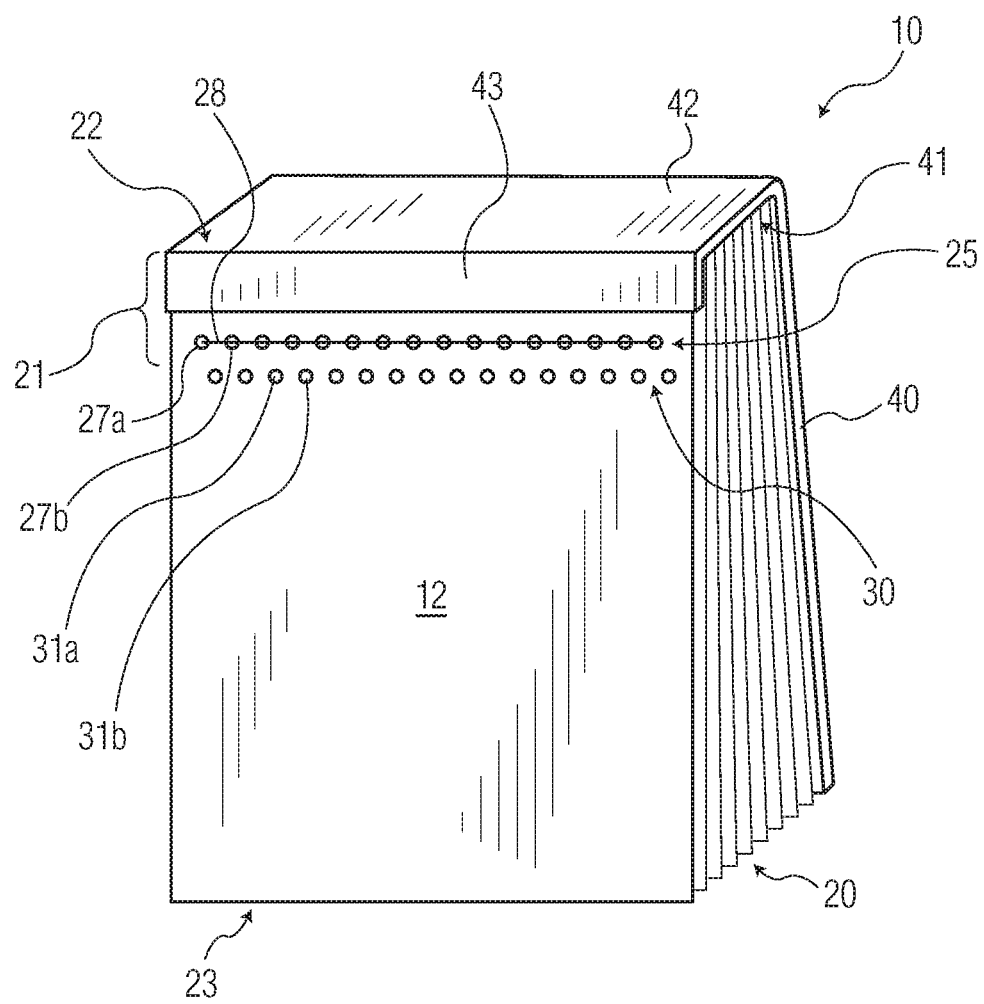
FIG. 2 is a perspective view of a stack of absorbent sheets according to another embodiment of the present invention.

With reference now to FIG. 2, in addition to line of stitching 25 the stack 10 may further comprise a backing sheet 40 having a portion that is bent over the top edge 22 of the stack to form a top end 42 and facing 43. The backing sheet may be formed from a material having a stiffness greater than that of the absorbent sheets, such as cardboard or the like. The stiffness of a material may be measured using a Taber stiffness test described in ASTM standard D5650-97. As used herein Taber Stiffness and Taber Stiffness Units are generally reported as the MD measurement of a sample and are reported without reference to units. For example, the stiffness of the backing sheet or strip may be about 2 times greater, such as from about 2 to about 20 times greater, than the stiffness of the absorbent sheet material. In particularly preferred embodiments the backing sheet or strip and the absorbent sheet material not only differ in Taber Stiffness, but are formed from different materials. For example, in one embodiment the backing sheet or strip is formed from paperboard and has a machine-direction (MD) stiffness (measured as Taber Stiffness Units) greater than about 200 cm*gf and more preferably greater than about 250 cm*gf and the absorbent sheet is a cellulosic towel having a machine-direction (MD) stiffness (measured as Taber Stiffness Units) less than about 5.0 and more preferably less than about 3.0.

With continued reference to FIG. 2, the backing sheet 40 comprises a folded over portion 41 that extends around and over the top edge 22 to form a bound top edge 42 and a facing 43 that contacts the top most sheet 12 of the stack 10. In this manner the binding area 21 comprises both the line of stitches 25 and the folded over back sheet 40. As illustrated in FIG. 2 the line of stitches 25 are disposed such that the stitch holes 27a, 27b and thread 28 do not contact the folded over portion of the back sheet 40, however the invention is not so limited. In other embodiments the line of stitches may be disposed on the folded over portion. In still other embodiments the stitches are not disposed on the folded over portion but extend through the back sheet.

While in certain embodiments it may be preferred to bind the sheets with stitching alone and not use other forms of attachment, such as adhesive or other means of mechanical attachment, in those embodiments where a backing sheet is folded over to partially envelop the sheets an adhesive may be provided between the folded over backing sheet or strip and the absorbent sheets. Alternately, a backing sheet may be provided, but not folded over the sheets so as to provide rigidity to the stack. In such embodiments the backing sheet may be adhesively attached to the bottom most sheet in the stack or may be bound along with the stack using stitching as described herein.

In still other embodiments the binding may comprise a strip rather than a back sheet. The strip generally does not extend along the back portion of the stack, but rather is disposed along the top edge and may be folded over to extend along a portion of the front of the stack.

In certain embodiments the backing sheet or strip may comprise a means for mounting the stack of absorbent sheets to a surface. In other embodiments a holder may be provided which may be made of metal, plastic or other suitable material and shaped to receive the bound edge of the stack to retain and hold the stack: The shape of the holder may be in the form of a flattened slotted tube or channel member open at least on one end to receive the bound edge of the stack. The holder may provide a means for fastening the holder to a vertical surface. When mounting the stack, the holder is fastened on a wall or the like and the pad is engaged therewith by inserting one end of the bound edge into the channel.

With reference again to FIG. 1, in addition to a line of stitches 25 binding a plurality of individual absorbent sheets 20 together to form a stack 10, individual sheets 20 comprise a line of perforations 30. The line of perforations 30 generally comprises spaced apart individual perforation holes 31a, 31b. The line of perforations 30 may be disposed parallel and adjacent to the line of stitching 25, as illustrated n FIG. 1, but the invention is not so limited.

Figure 3:
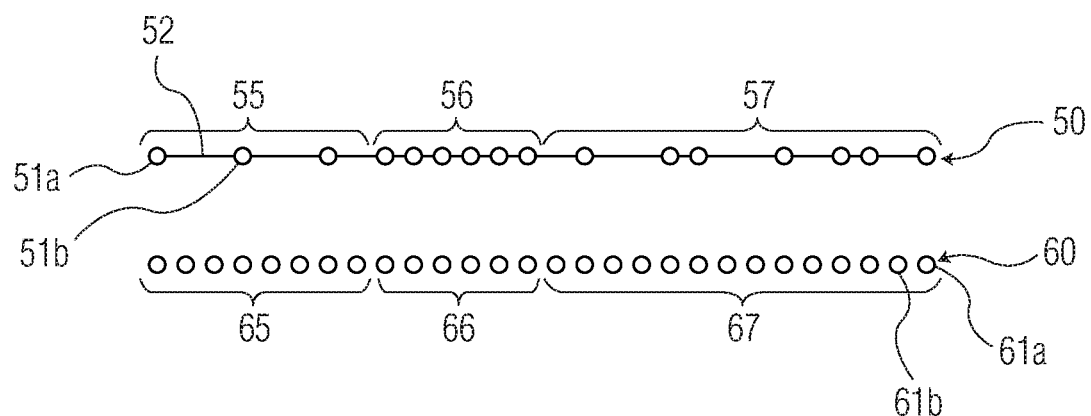
FIG. 3 illustrates one embodiment of a line of stitches and a line of perforations useful in the present invention.

As discussed above, the line of stitching comprises a continuous line of stitch holes. Similarly, the line of perforation is also formed from a plurality of spaced apart holes (referred to herein as perforation holes) wherein at least a portion of the plurality of stitches and a portion of the plurality of perforation holes are arranged pairwise. For example, with reference to FIG. 3, the line of stitching 50 comprises a continuous line of stitch holes 51a, 51b with a thread 52 disposed between adjacent stitch holes. The stitch holes 51a, 51b are disposed in a pattern that comprises a first region 55, a second region 56 and third region 57. The line of perforations 60 comprises a continuous line of perforation holes 61a, 62b comprising a first region 65, a second region 66 and third region 67. In the illustrated embodiment the stitch holes 51 in the in the second region 56 and the perforation holes 61 of the second region are arranged pairwise where each stitch hole has a corresponding perforation hole.

In a particularly preferred embodiment, all of the holes forming the line of stitching and the holes forming the line of perforation are arranged pairwise. In certain embodiments at least about 50 percent, and more preferably at least about 60 percent and still more preferably at least about 70 percent, such as from about 50 to about 100 percent and more preferably from about 70 to about 100 percent of stitching holes has a corresponding perforation hole. In this manner there is a one-to-one numerical correspondence between at least a portion of the plurality of perforation holes and at least a portion of the plurality of stitching holes.

In certain embodiments not only are the stitching and perforations holes arranged pairwise, the two lines of holes are generally arranged parallel and adjacent to one another. In still other embodiments the stitching and perforation holes are substantially vertically aligned with one another. For example, with reference to FIG. 1 the stitch holes 27 forming the line of stitching 25 and the perforation holes 31 forming the line of perforation 30 are arranged pairwise and are substantially vertically aligned with one another.

While the stitching holes and perforations holes may be aligned vertically, the invention is not so limited. In another embodiment, such as that illustrated in FIG. 2, there is a one-to-one numerical correspondence between the stitch holes 27 forming the line of stitching 25 and the perforation holes 31 forming the line of perforation 30, however, the holes 27, 31 are not vertically aligned. Thus, the stitching holes and perforations holes may be vertically offset from one another, but still maintain a one-to-one numerical correspondence.

Figure 4A:
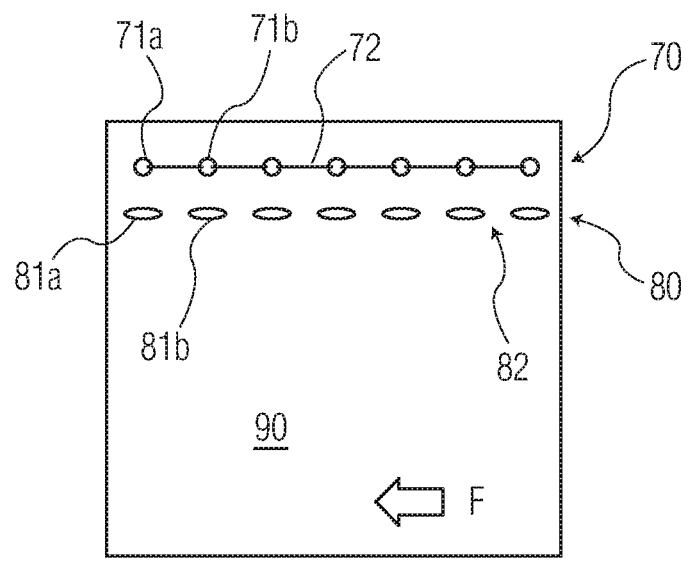
FIGS. 4A-4B illustrate various combinations of stitch and perforation hole shapes useful in the present invention.
Figure 4B:
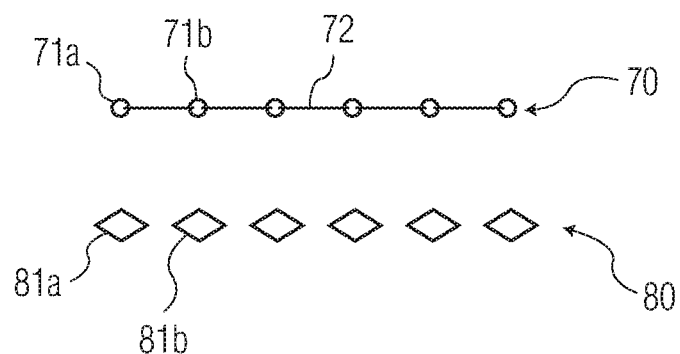

Further, while it is preferred that at least a portion of the stitching and perforation holes be arranged pairwise, the size and shape of the holes need not be similar. Accordingly, in certain embodiments the stitching hole and the perforation hole have different shapes. In other embodiments the stitching hole and the perforation hole have different areas. For example, with reference to FIGS. 4A and 4B, non-liming examples of stitching and perforation hole shapes and sizes are illustrated. For example, as illustrated in FIG. 4A the line of perforations 80 may comprise perforation holes 81a, 81b that are oval shaped and the line of stitching 70 may comprise stitch holes 71a, 71b that are circular. Alternatively, as illustrated in FIG. 4B the line of perforations 80 may comprise perforation holes 81a, 81b that are diamond shaped and the line of stitching 70 may comprise stitch holes 71a, 71b that are circular.

In particularly preferred embodiments it may be preferred to form the line of perforations from holes having a non-circular shape. For example, the line of perforations 80 may comprise perforation holes 81a, 81b that are oval shaped, as illustrated in FIG. 4A, and orientated such that stresses are concentrated at one end 82 when a user applies force (indicated by arrow) to a sheet 90 making it easier to initiate and propagate a tear along the perforation holes 80. As a result, a lower force may be required to tear the perforation and separate a sheet from the stack. In addition to the oval-shaped holes shown in FIG. 4A, other suitable non-circular hole shapes may be used, for example triangular, diamond or square shaped holes, to produce stress concentrations and lower tearing force. For example, as illustrated in FIG. 4B, the line of perforations 80 may comprise perforation holes 81a, 81b that are diamond shaped.

To achieve a pairwise arrangement of the stitch holes and perforation holes, the stack of absorbent material may be manufactured using a sewing process that employs a double, triple or quadruple needle. Sewing machines having multiple needles are well known in the art. In one embodiment, the machine may comprise a double-needle chuck supporting a pair of spaced-apart needles arranged to form a double row of spaced apart holes. In the foregoing embodiment the needles may be in vertical alignment with one another, producing stitch holes and perforation holes that are similarly aligned, or they may be offset from one another. In other instances, a unitary needle having two or more tines may be used where one tine is used to sew the line of stitches and the other is used to form the line of perforations. Regardless if the apparatus employs separate needles or a unitary needle having a plurality of tines, generally one of the needles or tines is not provided with thread so as to only form holes, which in-turn forms the line of perforations.

In other embodiments additional weakened or perforated lines may be formed in each of the plurality of absorbent sheets to permit portions of each of the absorbent sheets to be removed from the stack. For example, additional perforated lines may be provided in each of the absorbent sheets to enable a user to remove only a portion of the sheet from the stack, such as a quarter or half of a sheet, while the remainder of the sheet remains bound to the stack.

The bound and perforated stack of absorbent sheets may be formed from a wide variety of absorbent sheet material. For example, the absorbent sheets have a basis weight (measured using TAPPI test method T-220) greater than about 10 grams per square meter (gsm), such as from about 10 to about 100 gsm and more preferably from about 15 to about 70 gsm and a caliper (measured in accordance with TAPPI test method T402 using an EMVECO 200-A Microgage automated micrometer (EMVECO, Inc., Newberg, Oreg.)) greater than about 200 µm, such as from about 200 to about 2000 µm. Further, the sheets may have a vertical absorbent capacity (measured as described in U.S. Pat. No. 7,449,085) greater than about 4.0 g/g, such as from about 4.0 to about 12 g/g and more preferably from about 6.0 to about 10 g/g.

In other embodiments the absorbent sheets have a dry geometric mean tensile strength (measured in accordance with TAPPI test method T-494 om-01) greater than about 500 g/3", and more preferably greater than about 750 g/3" and still more preferably greater than about 1,000 g/3", such as from about 500 to about 3500 g/3" and more preferably from about 1,000 to about 2,500 g/3". In this manner the absorbent sheets have sufficient tensile strength to withstand the force necessary to detach individual sheets from the stack.

The absorbent sheet material may comprise one ply or more than one ply and may be folded or unfolded. In certain embodiments the individual sheets within the stack may be folded to form a folded sheet having multi-layers. Upon removal of an individual sheet from the stack it may be unfolded to yield a single absorbent sheet having a surface area greater than the surface area of the stack.

Accordingly, individual absorbent sheets within a stack, in an embodiment, may be in a folded configuration such as half-folds or quarter-folds of the sheets. For example, a sheet having a half-fold configuration may have four different edges, a first end and a second end, opposite the first end. A binding element is disposed along the first end and a line of perforations is disposed adjacent thereto to enable the sheets to be removed individually from the stack. Other folding configurations may also be useful herein, for example, Z-folds, or C-folds.

Further, it should be understood that the sheets and the resulting stack may take any number of different shapes and that while it may be desirable for two or more edges of sheets to be aligned with one another, the invention is not so limited. Additionally, the size of individual sheets and the number of sheets in the stack corresponds to the number of usable units desired in the finished tissue product.

To manufacture a bound and perforated stack of absorbent sheets according to the present invention sheets are cut to size and stacked in facing arrangement. In a particularly preferred embodiment, the sheets are stacked in alignment with one another, that is that the machine directions of the sheets are aligned with one another and more preferably are aligned such that subsequent stitching is substantially perpendicular to the machine direction of the sheet.

A double sewing needle having first and second tines is adapted to be displaced in the vertical direction by a drive means. The first tine is pointed at its top end and a thread is engaged, with an appropriate engaging means if desired, to the top end of the needle. The thread can be delivered from a thread roll. After engaging the thread on the top end, the needle is moved towards and through the stack of sheets, creating a stitching hole and threading the thread through the hole. The shape and size of the stitch hole generally corresponds to the shape and size of the first tine. Simultaneously, the second tine is moved towards and through the stack of sheets to create a perforation hole.

While the inventive stacks of absorbent sheets have been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto and the foregoing embodiments:

In a first embodiment the present invention provides a stack of absorbent sheets comprising a plurality of absorbent sheets having a machine direction and a cross-machine direction stacked in facing arrangement to form a stack of absorbent sheets, the stack having a top edge and a bottom edge; a binding element for binding the sheets together to form a stack disposed adjacent to the top edge of the stack, the binding element comprising a line of stitches comprising a plurality of spaced apart stitching holes and a thread disposed between a first and a second stitching hole; and a line of perforations comprising a plurality of spaced apart perforation holes, wherein at least a portion of the perforation holes and stitching holes are arranged pairwise.

In a second embodiment the present invention provides the stack of absorbent sheets of the first embodiment wherein absorbent sheets have a basis weight greater than about 10 grams per square meter (gsm), a geometric mean tensile strength (GMT) from about 500 to about 3,500 g/3" and a vertical absorbent capacity greater than about 4.0 g/g.

In a third embodiment the present invention provides the stack of absorbent sheets of the first or the second embodiments wherein the plurality of absorbent sheets comprises half-folded or quarter-folded absorbent sheets.

In a fourth embodiment the present invention provides the stack of absorbent sheets of any one of the first through the third embodiments wherein the plurality of absorbent sheets comprises half-folded or quarter-folded absorbent sheets.

In a fifth embodiment the present invention provides the stack of absorbent sheets of any one of the first through the fourth embodiments wherein the stitching holes have a first shape and the perforation holes have a second shape, wherein the first and second shapes are different.

In a sixth embodiment the present invention provides the stack of absorbent sheets of any one of the first through the fifth embodiments wherein the stitching holes have a round, semi-circular or oval shape and the perforation holes have a rectangular, square, diamond, oval, or linear shape.

In a seventh embodiment the present invention provides the stack of absorbent sheets of any one of the first through the sixth embodiments wherein the plurality of spaced apart stitching holes and the plurality of spaced apart perforation holes are both substantially linear and arranged parallel to one another.

In an eighth embodiment the present invention provides the stack of absorbent sheets of any one of the first through the seventh embodiments further comprising a backing sheet or strip, wherein the backing sheet or strip has a Taber Stiffness greater than the plurality of absorbent sheets.

In a ninth embodiment the present invention provides the stack of absorbent sheets of any one of the first through the eighth embodiments further comprising a backing sheet or strip folded over the top edge of the stack of absorbent sheets to form a portion of the binding element.

In a tenth embodiment the present invention provides the stack of absorbent sheets of any one of the first through the ninth embodiments wherein the stack is substantially free from adhesive.

In an eleventh embodiment the present invention provides the stack of absorbent sheets of any one of the first through the tenth embodiments further comprising a second line of stitches comprising a plurality of spaced apart stitching holes and a thread disposed between a first and a second stitching hole.

In a twelfth embodiment the present invention provides the stack of absorbent sheets of any one of the first through the eleventh embodiments wherein from about 50 to about 100 percent of stitching and perforation holes are arranged pairwise.

In a thirteenth embodiment the present invention provides the stack of absorbent sheets of any one of the first through the twelfth embodiments wherein from about 75 to about 100 percent of stitching and perforation holes are arranged pairwise.

In a fourteenth embodiment the present invention provides the stack of absorbent sheets of any one of the first through the thirteenth embodiments wherein there is a one-to-one numerical correspondence of the perforation holes and the stitching holes.

In a fifteenth embodiment the present invention provides the stack of absorbent sheets of any one of the first through the fourteenth embodiments wherein the pairwise arranged stitching and perforation holes are substantially vertically aligned.

What is claimed is:

1. A stack of absorbent sheets comprising:
   a. a plurality of absorbent sheets stacked in facing arrangement with one another to form a stack of absorbent sheets, the stack having a top edge and a bottom edge;
   b. a binding disposed adjacent to the top edge of the stack, the binding comprising a plurality of spaced apart stitching holes and a thread disposed between each of the plurality of spaced apart stitching holes; and
   c. a first line of perforations comprising a plurality of spaced apart perforation holes, wherein the quantity of perforation holes approximately corresponds to the quantity of stitching holes and the stitching holes and the perforation holes are vertically aligned with one another.

2. The stack of absorbent sheets of claim 1 wherein absorbent sheets have a basis weight greater than 10 grams per square meter, a geometric mean tensile strength from 500 to 3,500 g/3" and a vertical absorbent capacity greater than 4.0 g/g.

3. The stack of absorbent sheets of claim 1 wherein the plurality of absorbent sheets comprises half-folded or quarter-folded absorbent sheets.

4. The stack of absorbent sheets of claim 1 further comprising a second line of perforations comprising a plurality of spaced apart perforation holes.

5. The stack of absorbent sheets of claim 1 wherein the stitching holes have a first shape and the perforation holes have a second shape, wherein the first and second shapes are different.

6. The stack of absorbent sheets of claim 1 wherein the stitching holes have a round, semi-circular or oval shape and the perforation holes have a rectangular, square, diamond, oval, or linear shape.

7. The stack of absorbent sheets of claim 1 wherein the plurality of spaced apart stitching holes and the first line of perforations are both substantially linear and arranged parallel to one another.

8. The stack of absorbent sheets of claim 1 further comprising a backing sheet or strip, wherein the backing sheet or strip has a stiffness greater than the plurality of absorbent sheets.

9. A stack of absorbent sheets comprising:
   a. a plurality of absorbent sheets stacked in facing arrangement with one another to form a stack having a top edge and a bottom edge;
   b. a single line of stitches extending parallel to the top edge of the stack, the single line of stitches comprising first and second spaced apart stitch holes and at least one thread disposed between the first and the second stitch holes thereby forming a stitch; and
   c. a single line of perforations extending parallel to the top edge of the stack and spaced part from the single line of stitches, the single line of perforations comprising a plurality of individual perforation holes, wherein there is a one-to-one numerical correspondence between the stitch holes and the perforation holes, and the stitching holes and the perforation holes are vertically aligned with one another.

10. The stack of absorbent sheets of claim 9 wherein absorbent sheets have a basis weight greater than 10 grams per square meter, a geometric mean tensile strength from 500 to 3,500 g/3" and a vertical absorbent capacity greater than 4.0 g/g.

11. The stack of absorbent sheets of claim 9 wherein the plurality of absorbent sheets comprises half-folded or quarter-folded absorbent sheets.

12. The stack of absorbent sheets of claim 9 further comprising a second line of perforations comprising a plurality of spaced apart perforation holes.

13. The stack of absorbent sheets of claim 9 wherein the stitch holes have a first shape selected from the group consisting of round, semi-circular and oval, and the perforation holes have a second shape selected from the group consisting of rectangular, square, diamond, oval and linear.

14. The stack of absorbent sheets of claim 9 further comprising a backing sheet or strip, wherein the backing sheet or strip has a stiffness greater than the plurality of absorbent sheets.

15. A method of manufacturing a stack of sewn and perforated absorbent sheets comprising the steps of:
   a. providing a plurality of absorbent sheets;
   b. stacking the plurality of absorbent sheets in facing arrangement with one another to form a stack having a height, a length and a width;
   c. providing a sewing and perforating apparatus comprising a first tine and a second tine; wherein the first tine is adapted to receive a thread and the first and second tines are adapted to be displaced in a vertical direction;
   d. threading the first tine with a thread;
   e. moving the first and second tines towards and through the stack of sheets, wherein the first tine creates a stitch hole and the thread is threaded through the stitch hole and the second tine creates a perforation hole; and
   f. moving the sewing and perforating apparatus or the stack of sheets and repeating step (e).

16. The method of claim 15 further comprising the step of cutting the plurality of sheets prior to step (b).

17. The method of claim 15 further comprising the steps of providing a backing sheet or strip and folding the backing sheet or strip over a first end of the stack.

* * * * *